(12) United States Patent
Kwon

(10) Patent No.: US 7,116,152 B2
(45) Date of Patent: Oct. 3, 2006

(54) DIGITAL CIRCUIT TOLERANT OF RACE CONDITION PROBLEM

(75) Inventor: Yo-han Kwon, Gunpo-si (KR)

(73) Assignee: Samsung Electronics, Co., Ltd., (KR)

( * ) Notice: Subject to any disclaimer, the term of this patent is extended or adjusted under 35 U.S.C. 154(b) by 7 days.

(21) Appl. No.: 11/031,546

(22) Filed: Jan. 7, 2005

(65) Prior Publication Data
US 2005/0190753 A1 Sep. 1, 2005

(30) Foreign Application Priority Data
Jan. 28, 2004 (KR) ............... 10-2004-0005311

(51) Int. Cl.
*H03K 17/62* (2006.01)
(52) U.S. Cl. .................. 327/403; 327/407; 327/34
(58) Field of Classification Search ........... 327/403, 327/407, 408; 326/119
See application file for complete search history.

(56) References Cited

U.S. PATENT DOCUMENTS

| | | | |
|---|---|---|---|
| 5,926,047 A | 7/1999 | Harrison | 327/159 |
| 6,300,816 B1 * | 10/2001 | Nguyen | 327/407 |
| 6,329,857 B1 * | 12/2001 | Fletcher | 327/57 |
| 6,400,641 B1 | 6/2002 | Manning | 365/233 |

FOREIGN PATENT DOCUMENTS

KR 93-1598 1/1993

* cited by examiner

*Primary Examiner*—Long Nguyen
(74) *Attorney, Agent, or Firm*—Mills & Onello LLP

(57) ABSTRACT

A digital circuit tolerant of a race condition problem circuit includes a sense amplifier receiving first and second input data and generating first and second sense amplification signals in response to an enable clock signal generated using a clock signal and an enable signal, and a cascode signal latch receiving the first and second sense amplification signals and generating first and second cascode signals. The first and second sense amplification signals or the first and second cascode signals are selectively transmitted by a switch unit as first and second output control signals, respectively, and then output as first and second multiplexer output signals, respectively, by a dynamic multiplexer in response to a predetermined selection signal.

8 Claims, 3 Drawing Sheets

DIGITAL CIRCUIT TOLERANT OF RACE CONDITION PROBLEM

BACKGROUND OF THE INVENTION

This application claims the priority of Korean Patent Application No. 2004-5311, filed on Jan. 28, 2004, in the Korean Intellectual Property Office, the disclosure of which is incorporated herein in its entirety by reference.

1. Field of the Invention

The present invention relates to digital circuit technology, and more particularly, to a digital circuit that is tolerant of a race condition problem.

2. Description of the Related Art

A race condition is a problem that is caused in a digital circuit when there is a difference between a speed at which a signal input to a digital circuit is transmitted and a speed at which a signal enabling the digital circuit is transmitted. A dynamic multiplexer (MUX) is an example of a simple circuit for explaining the race condition problem.

FIG. 1 illustrates a conventional dynamic MUX. Referring to FIG. 5, a conventional dynamic MUX 100 includes a flip-flop (F/F) 110 operating in response to a clock signal CLK, a buffer 120 buffering the clock signal CLK, a MUX 130 transmitting an output data DATA of the F/F 110 in response to an output of the buffer 120, and a driver 140 outputting an output of the MUX 130 as an output signal OUT. The operation of the dynamic MUX 100 is determined by the MUX 130. A node signal E, i.e., the output of the buffer 120, enables the MUX 130 so that the output data DATA of the F/F 110 is transmitted to the driver 140.

FIG. 2 is a timing diagram that illustrates the operation of the dynamic MUX 100. The buffer 120 outputs the node signal E following a time delay in response to the clock signal CLK. The output data DATA of the F/F 110 is set to, for example, a logic "low" level. Taking into account the operation of the MUX 130, the output data DATA of the F/F 110 should be applied to the MUX 130 prior to the an enable signal, i.e., the node signal E.

However, as shown in FIG. 2, it may occur that the node signal E at a logic "high" level is generated prior to the output data DATA at the logic "low" level. In this case, the output signal OUT of the dynamic MUX 100 is at the logic "low" level when the node signal E is activated and then becomes the desirable logic "high" level in response to the output data DATA of the F/F 110. In other words, when the output data DATA of the F/F 110 is applied at a time that is later than the node signal E, the dynamic MUX 100 does not output a desired signal when the node signal E, the enable signal, is activated. A difference between a time when the output data DATA of the F/F 110 is applied to the MUX 130 and a time when the node signal E is applied to the MUX 130 becomes a racing condition problem, which causes the dynamic MUX 100 to operate unreliably.

SUMMARY OF THE INVENTION

The present invention provides a digital circuit tolerant of a race condition problem.

According to an aspect of the present invention, there is provided a digital circuit including a control signal generation unit receiving a clock signal and an enable signal and generating an enable clock signal and a selection signal; a sense amplifier receiving first input data and second input data and generating a first sense amplification signal and a second sense amplification signal in response to the enable clock signal; a cascode signal latch receiving the first and second sense amplification signals and generating a first cascode signal and a second cascode signal; a switch unit selectively transmitting the first and second sense amplification signals or the first and second cascode signals as a first output control signal and a second output control signal, respectively, in response to the selection signal; and a dynamic multiplexer outputting the first and second output control signals as a first multiplexer output signal and a second multiplexer output signal, respectively, in response to a selection signal.

In one embodiment, the control signal generation unit comprises: a first inverter receiving the clock signal; a latch latching the enable signal in response to an output of the first inverter; a NAND gate receiving the clock signal and a first output of the latch; a second inverter receiving an output of the NAND gate and generating the enable clock signal; and a third inverter receiving a second output of the latch and generating the selection control signal.

In another embodiment, the cascode signal latch changes logic levels of the respective first and second cascode signals in response to a transition of a logic level of either of the first and second sense amplification signals.

In another embodiment, the switch unit comprise: a first switch and a second switch respectively transmitting the first and second sense amplification signals as the first and second output control signals in response to the selection control signal; and a third switch and a fourth switch respectively transmitting the first and second cascode signals as the first and second output control signals in response to an inverted selection control signal.

In another embodiment, the dynamic multiplexer comprises: first and second N-type metal oxide semiconductor (NMOS) transistors connected in series between a first multiplexer input signal and a ground voltage and gated in response to the selection signal and the first output control signal, respectively; third and fourth NMOS transistors connected in series between a second multiplexer input signal and the ground voltage and gated in response to the selection signal and the second output control signal, respectively; a first inverter receiving the first multiplexer input signal and generating the first multiplexer output signal; and a second inverter receiving the second multiplexer input signal and generating the second multiplexer output signal.

In another embodiment, the dynamic multiplexer further comprises: a buffer receiving the clock signal and generating a precharge signal; a first P-type MOS (PMOS) transistor connected between a power supply voltage and the first multiplexer input signal and gated in response to the precharge signal; and a second PMOS transistor connected between the power supply voltage and the second multiplexer input signal and gated in response to the precharge signal.

According to another aspect of the present invention, there is provided a digital circuit including a first inverter receiving a clock signal; a latch latching an enable signal in response to an output of the first inverter; a NAND gate receiving the clock signal and a first output of the latch; a second inverter receiving an output of the NAND gate and generating an enable clock signal; a third inverter receiving a second output of the latch and generating a selection control signal; a sense amplifier receiving first input data and second input data and generating a first sense amplification signal and a second sense amplification signal in response to the enable clock signal; a cascode signal latch receiving the first and second sense amplification signals and changing logic levels of the first and second cascode signals in response to a transition of a logic level of either of the first and second sense amplification signals; a first switch and a second switch respectively transmitting the first and second sense amplification signals as first and second output control signals in response to the selection control signal; a third switch and a fourth switch respectively transmitting the first and second cascode signals as the first and second output control signals in response to an inverted selection control signal; first and second N-type metal oxide semiconductor (NMOS) transistors connected in series between a first multiplexer input signal and a ground voltage and gated in response to a selection signal and the first output control signal, respectively; third and fourth NMOS transistors connected in series between a second multiplexer input signal and the ground voltage and gated in response to the selection signal and the second output control signal, respectively; a fourth inverter receiving the first multiplexer input signal and generating a first multiplexer output signal; and a fifth inverter receiving the second multiplexer input signal and generating a second multiplexer output signal.

In one embodiment, the digital circuit further comprises: a buffer receiving the clock signal and generating a precharge signal; a first P-type MOS (PMOS) transistor connected between a power supply voltage and the first multiplexer input signal and gated in response to the precharge signal; and a second PMOS transistor connected between the power supply voltage and the second multiplexer input signal and gated in response to the precharge signal.

Accordingly, even though the data signals, i.e., the first and second output control signals, are applied to the dynamic multiplexer prior to the enable signal, i.e., the selection signal, the dynamic multiplexer reliably operates without the occurrence of a race condition problem.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
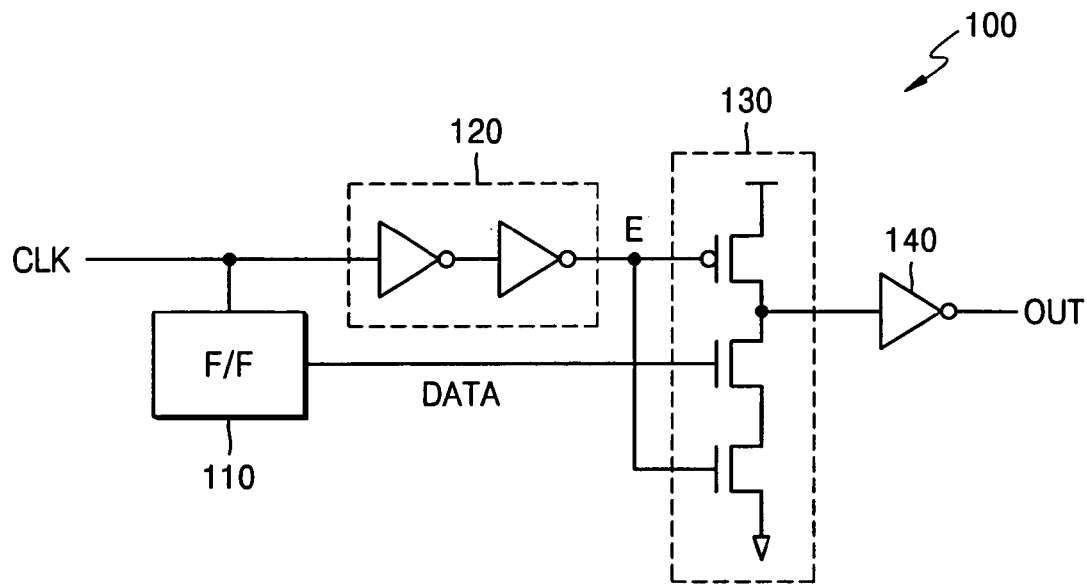
FIG. 1 illustrates a conventional dynamic multiplexer (MUX)
Figure 2:
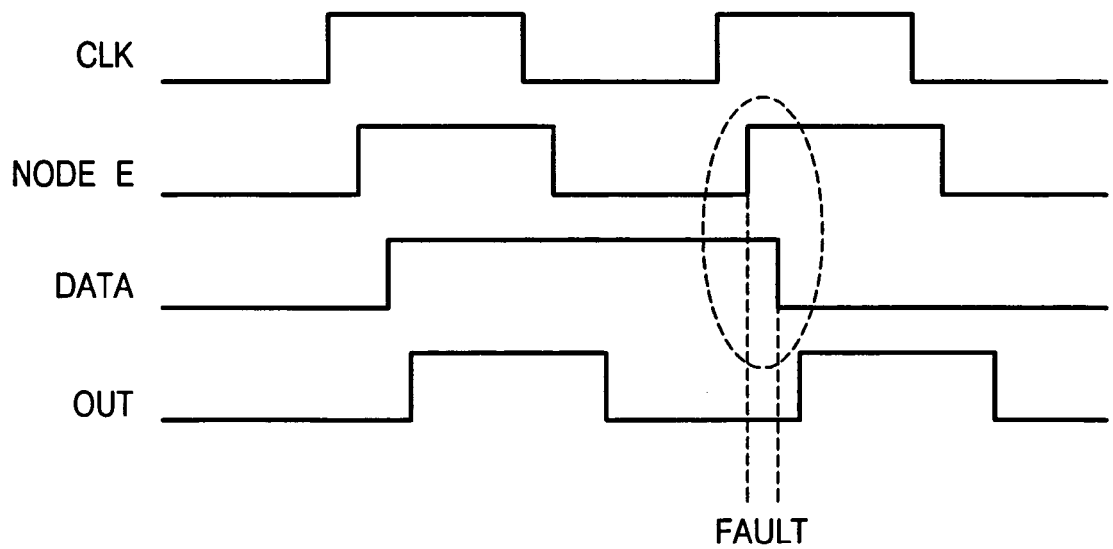
FIG. 2 is a timing chart that illustrates the operation of the conventional dynamic MUX shown in FIG. 1.

Hereinafter, preferred embodiments of the present invention will be described in detail with reference to the attached drawings. In the drawings, the same reference numerals denote the same member.

Figure 3:
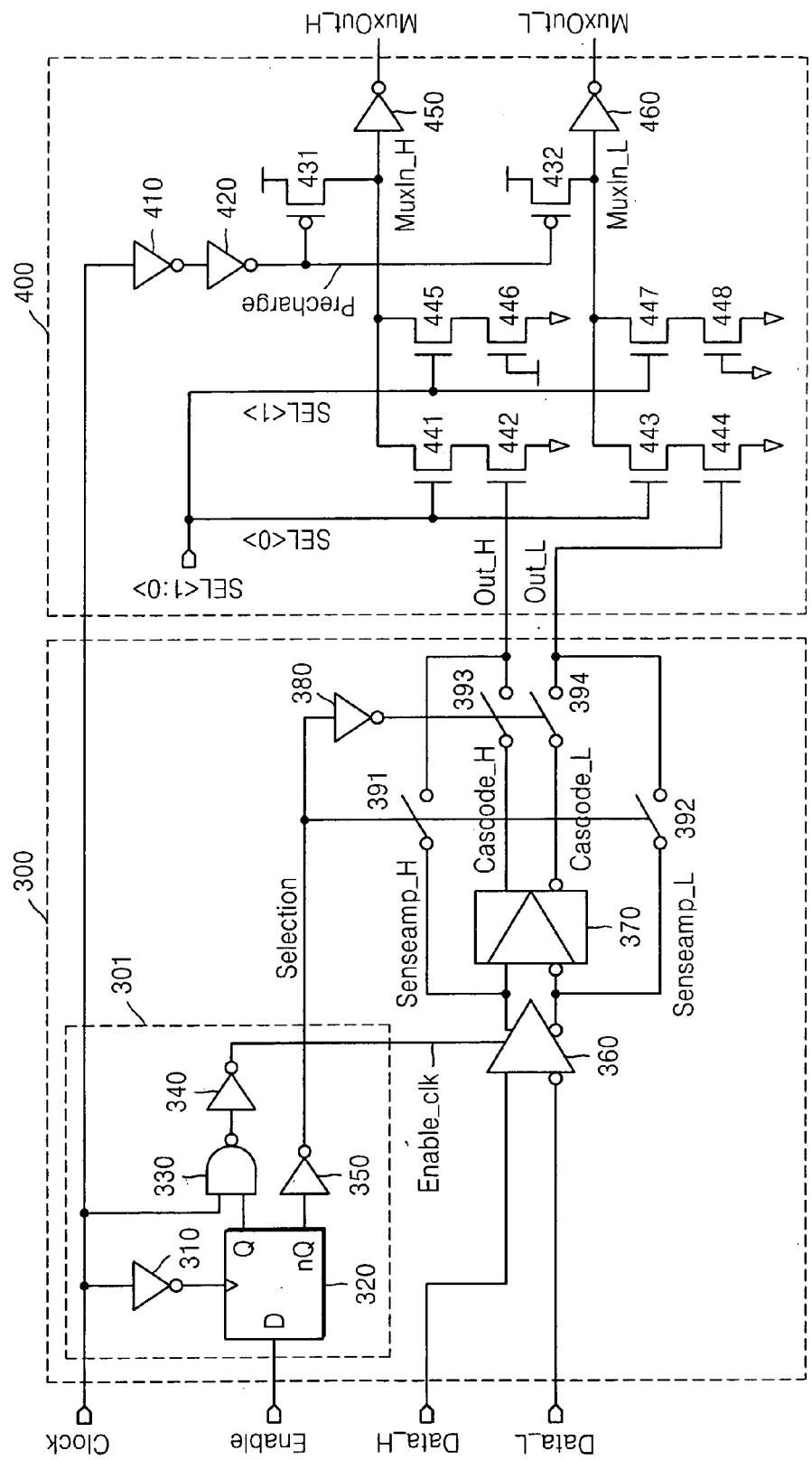
FIG. 3 illustrates a digital circuit according to an embodiment of the present invention.

FIG. 3 illustrates a digital circuit according to an embodiment of the present invention. The digital circuit includes a control unit 300 and a dynamic multiplexer (MUX) 400.

The control unit 300 includes a first inverter 310 receiving a clock signal. A latch 320 latches an enable signal in response to an output of the first inverter 310. A NAND gate 330 receives the clock signal and a first output Q of the latch 320. A second inverter 340 receives an output of the NAND gate 330 and generates an enable clock signal Enable_clk. A third inverter 350 receives a second output nQ of the latch 320 and generates a selection signal. The first through third inverters 310, 340, and 350, the latch 320, the NAND gate 330 are included in a control signal generation unit 301. A sense amplifier 360 receives first input data Data_H and second input data Data_L and generates a first sense amplification signal senseamp_H and a second sense amplification signal senseamp_L, respectively. A cascode signal latch 370 receives the first and second sense amplification signals senseamp_H and senseamp_L and generates first and second cascode signals cascode_H and cascode_L, respectively. A fourth inverter 380 receives the selection signal. First and second switches 391 and 392 transmit the first and second sense amplification signals senseamp_H and senseamp_L as first and second output control signals Out_H and Out_L, respectively, in response to the selection signal. Third and fourth switches 393 and 394 transmit the first and second cascode signals cascode_H and cascode_L as the first and second output control signals Out_H and Out_L, respectively, in response to an inverted selection signal.

The dynamic MUX 400 includes a first inverter 410 receiving the clock signal. A second inverter 420 receives an output of the first inverter 410 and generates a precharge signal. A first P-type metal oxide semiconductor (PMOS) transistor 431 is connected between a power supply voltage VDD and a first MUX input signal Muxin_H and is gated in response to the precharge signal. A second PMOS transistor 432 is connected between the power supply voltage VDD and a second MUX input signal Muxin_L and is gated in response to the precharge signal. First and second N-type MOS (NMOS) transistors 441 and 442 are connected in series between the first MUX input signal Muxin_H and a ground voltage Vss and gated in response to a first selection signal SEL<0> and the first output control signal Out_H, respectively. Third and fourth NMOS transistors 445 and 446 are connected in series between the first MUX input signal Muxin_H and the ground voltage Vss and gated in response to a second selection signal SEL<1> and the power supply voltage VDD, respectively. Fifth and sixth NMOS transistors 443 and 444 are connected in series between the second MUX input signal Muxlin_L and the ground voltage Vss and gated in response to the first selection signal SEL<0> and the second output control signal Out_L, respectively. Seventh and eighth NMOS transistors 447 and 448 are connected in series between the second MUX input signal Muxin_L and the ground voltage Vss and gated in response to the second selection signal SEL<1> and the ground voltage Vss, respectively. Third and fourth inverters 450 and 460 receive the first and second MUX input signals Muxin_H and Muxin_L and output first and second MUX output signals MuxOut_H and MuxOut_L, respectively.

Figure 4:
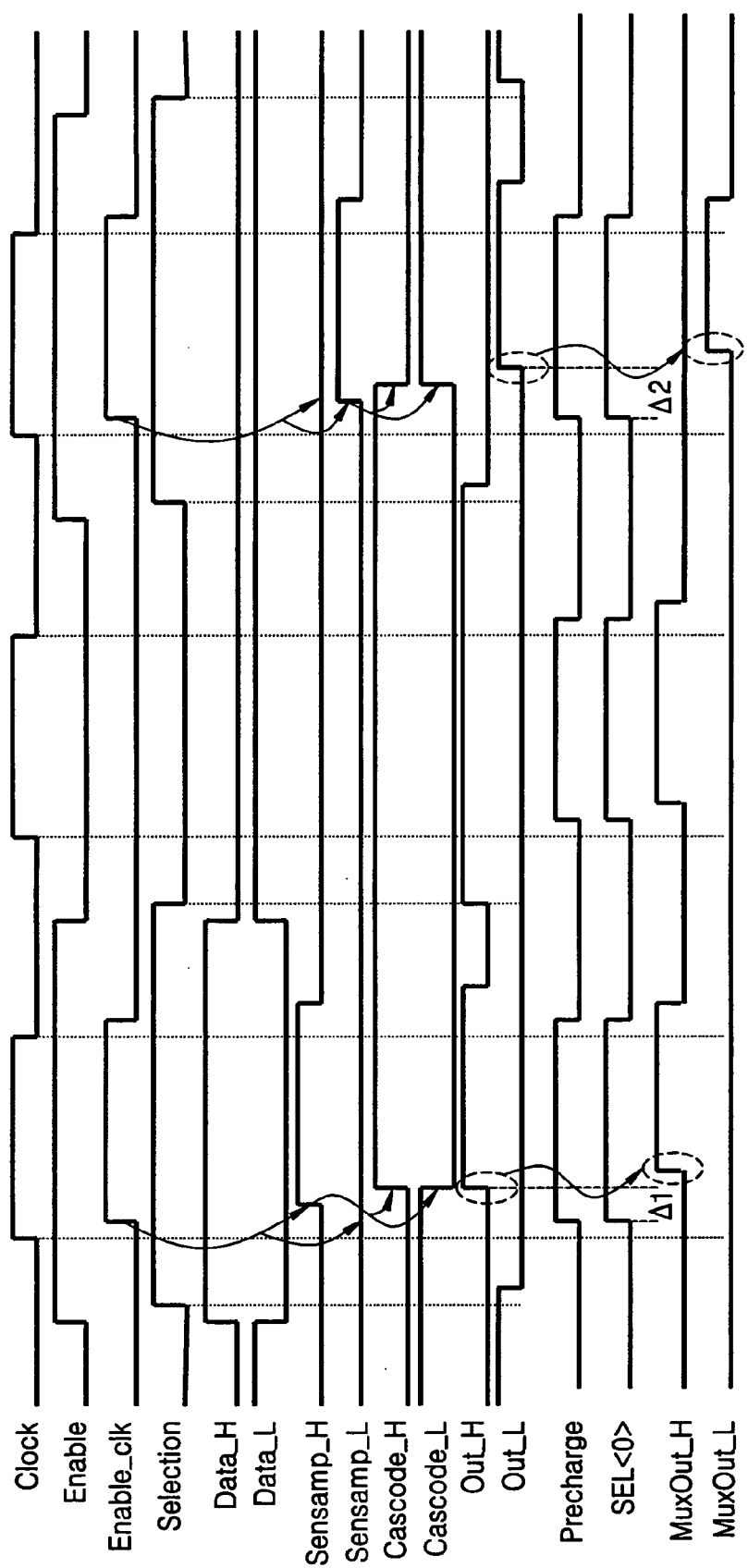
FIG. 4 is a timing chart that illustrates the operation of the digital circuit shown in FIG. 3.

The operation of the digital circuit will be described in detail with reference to FIG. 4 below. The selection signal and the enable clock signal Enable_clk are generated in response to the clock signal and the enable signal. The selection signal is generated according to the enable signal input while the clock signal is at a logic "low" level. The enable clock signal Enable_clk is generated according to the enable signal input while the clock signal is at a logic "high" level.

The first and second sense amplification signals senseamp_H and senseamp_L are generated according to logic levels of the first and second input data Data_H and Data_L input in response to the logic "high" level of the enable clock signal Enable_clk. In other words, in response to a first logic "high" level of the enable clock signal Enable_clk, the first sense amplification signal senseamp_H is generated as the logic "high" level, and in response to a second logic "high" level of the enable clock signal Enable- _clk, the second sense amplification signal senseamp_L is generated as the logic "high" level.

The first cascode signal cascode_H is generated as the logic "high" level in response to a transition of the first sense amplification signal senseamp_H from the logic "low" level to the logic "high" level and then becomes the logic "low" level in response to a transition of the second sense amplification signal senseamp_L from the logic "low" level to the logic "high" level. The second cascode signal cascode_L is generated as the logic "low" level in response to a transition of the first sense amplification signal senseamp_H from the logic "low" level to the logic "high" level and then becomes the logic "high" level in response to a transition of the second sense amplification signal senseamp_L from the logic "low" level to the logic "high" level.

The first and second output control signals Out_H and Out_L are generated according to the logic levels of the first and second sense amplification signals senseamp_H and senseamp_L while the selection signal is at the logic "high" level and generated according to the logic levels of the first and second cascode signals cascode_H and cascode_L while the selection signal is at the logic "low" level.

The precharge signal is generated according to the logic level of the clock signal. While the precharge signal is at the logic "low" level, the first and second MUX input signals Muxin_H and Muxin_L are generated as the logic "high" level and the first and second MUX output signals MuxOut_H and MuxOut_L are generated as the logic "low" level.

While the precharge signal is at the logic "high" level, the first and second MUX input signals Muxin_H and Muxin_L are generated in response to the first and second output control signals Out_H and Out_L and the first and second selection signals SEL<0> and SEL<1>. For example, where the first selection signal SEL<0> and the precharge signal are generated almost simultaneously, the first and second MUX output signals MuxOut_H and MuxOut_L are generated according to the logic levels of the first and second output control signals Out_H and Out_L while the first selection signal SEL<0> is at the logic "high" level.

The first selection signal SEL<0> corresponds to the node signal E, i.e., the enable signal, shown in FIG. 1. The first and second output control signals Out_H and Out_L correspond to the DATA shown in FIG. 1. In order to prevent a race condition problem, the logic levels of the first and second output control signals Out_H and Out_L should be applied the dynamic MUX 400 before the first selection signal SEL<0> is activated to the logic "high" level.

However, in the embodiment of the present invention, even though the logic levels of the first and second output control signals Out_H and Out_L are applied to the dynamic MUX 400 after the first selection signal SEL<0> is activated to the logic "high" level, the race condition problem does not occur. This is because the logic levels of the first and second output control signals Out_H and Out_L are respectively the same as those of the first and second sense amplification signals senseamp_H and senseamp_L generated according to the logic levels of the first and second input data Data_H and Data_L while the enable clock signal Enable_clk is at the logic "high" level, as shown in FIG. 4. In other words, while one of the first and second output control signals Out_H and Out_L is at the logic "low" level, the other of them becomes logic "high" level. Here, the precharge signal and the first selection signal SEL<0> are at the logic "high" level, during which the first and second MUX output signals MuxOut_H and MuxOut_L are generated according to the logic levels of the first and second output control signals Out_H and Out_L. Finally, the first and second MUX output signals MuxOut_H and MuxOut_L are generated as the same levels as those of the first and second input data Data_H and Data_L, respectively, while the enable clock signal Enable_clk is at the logic "high" level.

While the enable clock signal Enable_clk is at the logic "high" level, even though the first and second output control signals Out_H and Out_L at the logic "high" level and the logic "low" level, respectively, are not applied before the first selection signal SEL<0> becomes the logic "high" level, that is, the first and second output control signals Out_H and Out_L are input to the dynamic MUX 400 at predetermined times Δ1 and Δ2, respectively, after transition of the first selection signal SEL<0> to the logic "high" level, the first and second MUX output signals MuxOut_H and MuxOut_L are generated as the logic "high" level and the logic "low" level, respectively, without the race condition problem.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A digital circuit comprising:
   a control signal generation unit receiving a clock signal and an enable signal and generating an enable clock signal and a selection signal;
   a sense amplifier receiving first input data and second input data and generating a first sense amplification signal and a second sense amplification signal in response to the enable clock signal;
   a cascode signal latch receiving the first and second sense amplification signals and generating a first cascode signal and a second cascode signal;
   a switch unit selectively transmitting the first and second sense amplification signals or the first and second cascode signals as a first output control signal and a second output control signal, respectively, in response to the selection signal; and
   a dynamic multiplexer outputting the first and second output control signals as a first a multiplexer output signal and a second multiplexer output signal, respectively, in response to a selection signal.

2. The digital circuit of claim 1, wherein the control signal generation unit comprises:
   a first inverter receiving the clock signal;
   a latch latching the enable signal in response to an output of the first inverter;
   a NAND gate receiving the clock signal and a first output of the latch;
   a second inverter receiving an output of the NAND gate and generating the enable clock signal; and
   a third inverter receiving a second output of the latch and generating the selection control signal.

3. The digital circuit of claim 1, wherein the cascode signal latch changes logic levels of the respective first and second cascode signals in response to a transition of a logic level of either of the first and second sense amplification signals.

4. The digital circuit of claim 1, wherein the switch unit comprises:
   a first switch and a second switch respectively transmitting the first and second sense amplification signals as the first and second output control signals in response to the selection control signal; and a third switch and a fourth switch respectively transmitting the first and second cascode signals as the first and second output control signals in response to an inverted selection control signal.

5. The digital circuit of claim 1, wherein the dynamic multiplexer comprises:
first and second N-type metal oxide semiconductor (NMOS) transistors connected in series between a first multiplexer input signal and a ground voltage and gated in response to the selection signal and the first output control signal, respectively;
third and fourth NMOS transistors connected in series between a second multiplexer input signal and the ground voltage and gated in response to the selection signal and the second output control signal, respectively;
a first inverter receiving the second multiplexer input signal and generating the first multiplexer output signal; and
a second inverter receiving the second multiplexer input signal and generating the second multiplexer output signal.

6. The digital circuit of claim 5, wherein the dynamic multiplexer further comprises:
a buffer receiving the clock signal and generating a precharge signal;
a first P-type MOS (PMOS) transistor connected between a power supply voltage and the first multiplexer input signal and gated in response to the precharge signal; and
a second PMOS transistor connected between the power supply voltage and the second multiplexer input signal and gated in response to the precharge signal.

7. A digital circuit comprising:
a first inverter receiving a clock signal;
a latch latching an enable signal in response to an output of the first inverter;
a NAND gate receiving the clock signal and a first output of the latch;
a second inverter receiving an output of the NAND gate and generating an enable clock signal;
a third inverter receiving a second output of the latch and generating a selection control signal;
a sense amplifier receiving first input data and second input data and generating a first sense amplification signal and a second sense amplification signal in response to the enable clock signal;
a cascode signal latch receiving the first and second sense amplification signals and changing logic levels of the first and second cascode signals in response to a transition of a logic level of either of the first and second sense amplification signals;
a first switch and a second switch respectively transmitting the first and second sense amplification signals as first and second output control signals in response to the selection control signal;
a third switch and a fourth switch respectively transmitting the first and second cascode signals as the first and second output control signals in response to an inverted selection control signal;
first and second N-type metal oxide semiconductor (NMOS) transistors connected in series between a first multiplexer input signal and a ground voltage and gated in response to a selection signal and the first output control signal, respectively;
third and fourth NMOS transistors connected in series between a second multiplexer input signal and the ground voltage and gated in response to the selection signal and the second output control signal, respectively;
a fourth inverter receiving the first multiplexer input signal and generating a first multiplexer output signal; and
a fifth inverter receiving the second multiplexer input signal and generating a second multiplexer output signal.

8. The digital circuit of claim 7, further comprising:
a buffer receiving the clock signal and generating a precharge signal;
a first P-type MOS (PMOS) transistor connected between a power supply voltage and the first multiplexer input signal and gated in response to the precharge signal; and
a second PMOS transistor connected between the power supply voltage and the second multiplexer input signal and gated in response to the precharge signal.

* * * * *

UNITED STATES PATENT AND TRADEMARK OFFICE
CERTIFICATE OF CORRECTION

PATENT NO. : 7,116,152 B2  
APPLICATION NO. : 11/031546  
DATED : October 3, 2006  
INVENTOR(S) : Yo-han Kwon It is certified that error appears in the above-identified patent and that said Letters Patent is hereby corrected as shown below:

Column 6, line 43, delete the second occurrence of "a"

Column 7, line 17, delete "second" and insert --first--

Signed and Sealed this

Sixth Day of March, 2007

JON W. DUDAS  
*Director of the United States Patent and Trademark Office*